April 26, 1966 W. J. WOSTL 3,247,705
METHOD AND APPARATUS FOR MEASURING KNOCK
Filed July 14, 1961 2 Sheets-Sheet 1
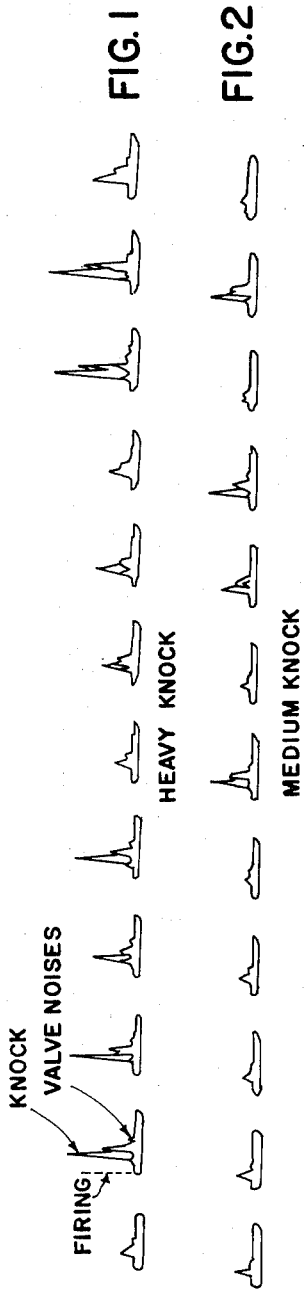
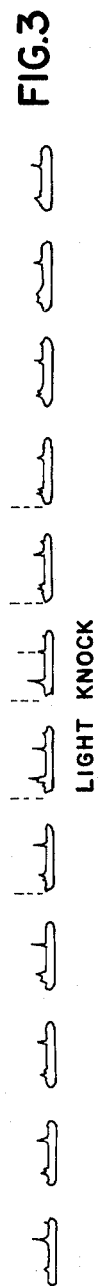
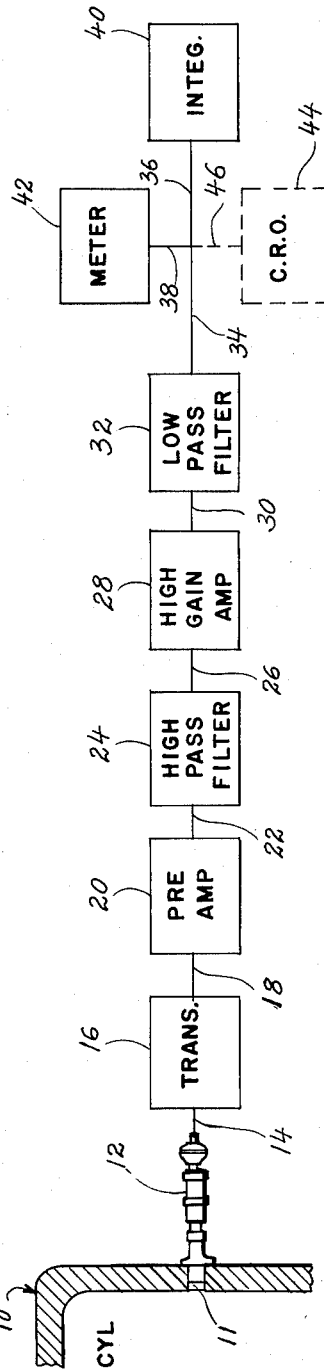
INVENTOR.
WOLFGANG J. WOSTL
BY
Adams, Forward & McLean
ATTORNEYS April 26, 1966  W. J. WOSTL  3,247,705
METHOD AND APPARATUS FOR MEASURING KNOCK
Filed July 14, 1961  2 Sheets-Sheet 2
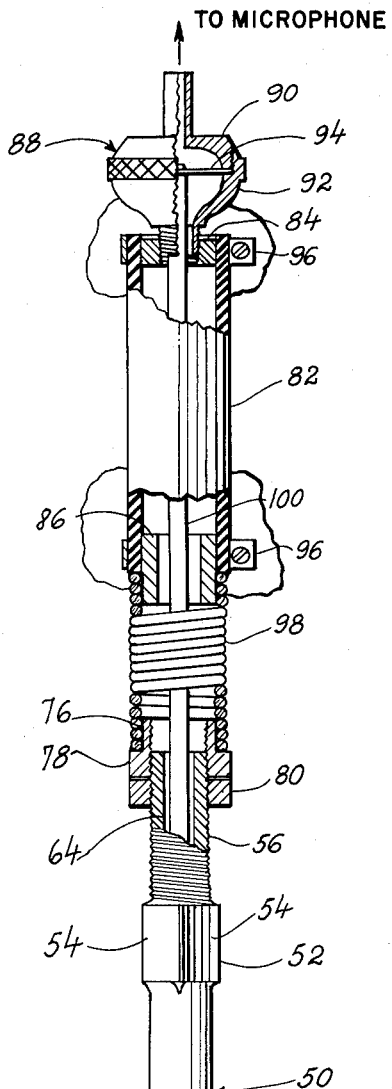
FIG. 5
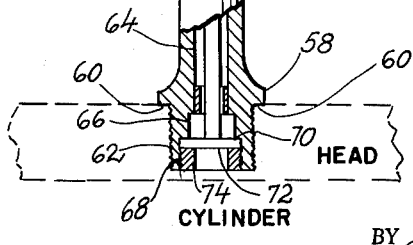
INVENTOR.
WOLFGANG J. WOSTL
BY Adams, Forward & McLean
ATTORNEYS

United States Patent Office 3,247,705
Patented Apr. 26, 1966

3,247,705
METHOD AND APPARATUS FOR MEASURING KNOCK
Wolfgang J. Wostl, Harvey, Ill., assignor to Sinclair Research, Inc., Harvey, Ill., a corporation of Delaware
Filed July 14, 1961, Ser. No. 124,043
7 Claims. (Cl. 73—35)

My invention relates to a method and apparatus for measuring knock in a spark-ignition internal combustion engine based upon the audible sounds originating within the combustion chamber.

Detection of knock by aural means, in addition to its inherent inaccuracies, fails to yield good reproducibility inasmuch as the results obtained by the aural method are subject to interpretation by the individual operator. Vibration analysis, while yielding valuable information regarding engine operation, is mainly unsuitable for knock rating tests. There is a need in the art for a suitable and accurate method for measuring engine knock having good reproducibility.

An object of my invention is to provide a method for accurately measuring engine knock.

Another object of my invention is to provide an accurate method of measuring knock possessing the quality of good reproducibility.

A further object of my invention is to provide an apparatus for employing the method of my invention.

Of the wide range of audible sounds originating within an engine, I have found that the ordinary operating noises of the engine fall generally within the frequency range below 4 kc. Further investigation revealed that sounds in the general range starting at about 5 to 6 kc. and going up to about 13 kc. were detected only in significant magnitude when there was engine knock. From this it was deduced that the sounds due to knock fell within a particular frequency range and that such sounds could be employed as a measure of the knock.

While the knock sounds of different engines employing different fuel blends and subject to different operating conditions evidenced knock sounds covering a broad spectrum from about 2 kc. to about 10 kc., and up to 13 kc. in the case of extremely heavy knock, in almost every case a component of the knock sound fell in the range of 6 kc. to 7 kc. Thus, even if the major components of the knock sound are in the range, for example, from 2.5 kc. to 4 kc. for a particular situation, a significant component can still be found in the range of 6 kc. to 7 kc.

The following tables are illustrative of the frequency spectrum of knock sounds. Table I shows the frequency range obtained from a group of representative fuels. Table II shows the variation of frequency in knock sounds obtained under different operating conditions. It will be noticed that in all instances in Tables I and II a component of the knock sounds falls within the frequency range of 6 to 7 kc.

Table I

| Gasoline | Frequency range, kc. | Comments |
| --- | --- | --- |
| Iso-octane | 2.5–10 | Distinct peaks, 6–7 kc. |
| Iso-octane+1.5 cc. TEL | 2.5–7 | Small peaks, 6–6.5 kc. |
| Iso-octane+0.5 cc. TEL | 2.5–7 | Do. |
| 90% iso-octane, 10% normal heptane+3 cc. TEL. | 2.5–7 | No peaks. |
| 80% di-isobutylene, 20% normal heptane. | 2.5–7 | Distinct peaks, 5–7 kc. |
| Commercial gasoline—Blend 1 | 2.5–10 | Most components between 2.5–4 kc. |
| Commercial gasoline—Blend 2 | 2.5–12 | Distinct peaks, 5.5–7.5 kc. |
| Lt. fluid (neat) | 2.5–7.5 | Distinct peaks, 6–7 kc. |
| Lt. fluid+3 cc. TEL | 2.5–7.5 | Small peaks, 6–6.5 kc. |
| 4 blends (neat) | 2.5–7.5 | Distinct peaks, 5.5–7.5 kc. |
| 4 blends+3 cc. TEL | 2.5–7 | No peaks at 5.5–7.5 kc. |

NOTE.—Engine speed, 1,800 r.p.m.; C.R., 8:1; F/A, .078.

Table II
FREQUENCY RANGE

| Fuel | 6:1 C.R. | MAP | 8:1 C.R. | MAP | 10:1 C.R. | MAP | 12:1 C.R. | MAP |
| --- | --- | --- | --- | --- | --- | --- | --- | --- |
| 90% iso-octane, 10% normal heptane. | 2.5–10 kc.; most components, 2.5–5 kc. | 35″ | | | 2.5–10 kc.; distinct peaks, 6–7 kc. | 20″ | | |
| 90% iso-octane, 10% normal heptane+3 cc. TEL. | 2.5–7 kc.; most components, 2.5–5 kc. | 50″ | 2.5–7 kc.; no peaks | 36.5″ | | | 2.5–7 kc.; most comp. | 23.5″ |
| 80% di-isobutylene, 20% normal heptane. | 2.5–7 kc.; most components, 2.5–5 kc. | 42″ | 2.5–7 kc.; distinct pks., 5–7 kc. | 26.5″ | 3–20 kc.; some peaks around 6 and 10 kc. | 16″ | | |
| Commercial gasoline—Blend 1. | 2.5–8 kc.; hvy. comp. between 2.5–4 kc. | 52″ | 2.5–8 kc.; most compts. between 2.5–4 kc. | 36″ | | | 2.5–8 kc.; low freq. compts. have decreased. | 17″ |
| Commercial gasoline—Blend 2. | 2.5–8 kc.; small peaks, 6–7 kc. | 37″ | 2.5–12 kc.; distinct pks., 5.5–7.5 kc. | 27″ | 2.5–20 kc.; pks., 2.5–3.5 kc.; pks., 5–10 kc. | 19″ | | |
| Lt. fluid plus 3 cc. TEL. | 2.5–7 kc.; most components, 2.5–4 kc. | 50″ | 2.5–7 kc.; small pks., 5.5–7.5 kc. | 29″ | 2.5–8 kc., pks., 2.5–3.5 kc.; pks., 5–7 kc. | 19″ | | |
| 4 blends plus 3 cc. TEL. | 2.5–6 kc.; most components, 2.5–5 kc. | 47″ | 2.5–7 kc.; no peaks | 32″ | 2.5–7 kc.; low freq. comp. decreased. | 21″ | | |

Inasmuch as other engine noise generally falls in the range up to 4 kc., a portion of the knock spectrum somewhat above this 4 kc. level should be obtained so as to eliminate any extraneous engine sounds and to provide a basis for accurate analysis. As a practical matter, however, the sounds in the range from about 10 to about 13 kc. are found only in the situation of extremely heavy knock and, therefore, do not generally contribute to an accurate analysis. Therefore, my discovery that knock sounds have a significant component in the 6 to 7 kc. range presents a frequency range which is easily obtainable and which also can be accurately analyzed.

Although a substantial frequency variation in knock sound is evidenced while employing different fuel blends and operating conditions, the particular frequency and variation in frequency of the knock sounds generated by other than the most intense knocking is apparently not as closely related to the degree of knock intensity as is the amplitude of the knock sounds. In order to determine the exact relationship between knock intensity and the amplitude of knock sounds, particularly in the 6 kc. to the 7 kc. range, graphical recordings of the amplitude of the knock sounds against a time base were made and analyzed.

Unexpectedly, amplitude alone was found not to be completely indicative of knock intensity. For example, a recording showing comparatively low peaks was made by an engine with distinctly audible knock, while a recording showing comparatively high peaks was made by an engine with barely audible knock. Further analysis, however, showed that knock intensity is related to three aspects of the amplitude versus time recordings, namely, (1) the amplitude of the individual pulses, (2) the ratio of the number of high to low pulses per unit of time, and (3) the duration of each pulse. Thus, a pulse of small amplitude but of long duration can be indicative of greater knock intensity than a pulse of great amplitude and short duration.

Briefly, the method of my invention includes generating a signal externally of an engine which signal corresponds in frequency and amplitude to the sounds originating within the engine. From the generated signal is selected that portion which falls within the range from about 6 kc. to about 7 kc. The amplitude and duration of the pulses of this selected range signal are indicative of the knock intensity of the engine.

The apparatus of my invention includes a detector for detecting the sounds originating within the engine. The output circuit of such detector generates a signal corresponding in frequency and amplitude to the engine sounds. The output circuit of the detector is connected as an input to a filter having an output circuit selectively responsive to that portion of the original signal within the range from about 6 kc. to about 7 kc. The amplitude and duration of the pulses in the output from the filter are indicative of the intensity of the knock in the engine.

Preferably, the output circuit of the filter is connected as the input to an integrator. The integrator has an output circuit responsive to the amplitude and duration of the signal received which yields the summation of the areas under the pulse curves, thereby indicating knock intensity in the engine.

The detector employed in the apparatus of my invention can be any of the wide variety of devices sensitive to vibrations which are well known to the art, e.g. a stethoscope or a vibration pick up such as a Sperry pick up. The detector can also be connected to a transducer, such as a microphone, to convert the mechanical energy of the detected knock sounds into an electrical signal before passing such signal to the filter. If it is desired, the transducer need not be employed and the detected sounds can be passed directly to the filter.

When the detected sounds are passed directly to the filter, such filter can be a mechanical baffling device which causes a damping of the sounds outside the desired range. If, however, the detector is coupled to a transducer, the filter can be a filter circuit of the type well known in the art and commonly termed a "band pass filter." As will be understood, such band pass filters can be adjusted so as to vary the upper and lower limits of the band which such filters will pass. Advantageously, a combination of a low pass and a high pass filter can be also employed to obtain the same general effect as with a band pass filter together with the capability of more accurate control of the attenuation at both the upper and lower limits of the selected range.

After the selected range signal has been obtained, either in the form of an electrical signal from the filter circuit or in the form of selected range sounds transduced into an electrical signal, the output circuit carrying such signal is connected as the input to the integrator which can be an integrating circuit of the type well known in the art. If it is desired, the output circuit carrying the selected range signal can also be connected as the input to a cathode ray oscilloscope whereby the wave forms of the signal can be visually displayed, or to a metering device whereby the amplitude of individual pulses can be measured.

To explain more fully the basis of operation of my invention, reference is made to the attached drawings in which:

FIGURE 1 is a representation of the sound pattern of heavy knock.

FIGURE 2 is a representation of the sound pattern of medium knock.

FIGURE 3 is a representation of the sound pattern of light knock.

FIGURE 4 is a schematic diagram of an apparatus embodying my invention.

FIGURE 5 is a partially sectioned view of a detecting device advantageously employed in the apparatus embodying my invention.

As mentioned above, there are three major variables related to knock intensity and in order to get the most accurate measurement of knock intensity, all three variables should be taken into account. However, since one or two of the variables are more significant than others, a fairly accurate measurement of knock intensity can be obtained by including only the more significant ones. By discussing three of the most practicable means of measuring knock in relation to FIGURES 1, 2 and 3, the operation and accuracy of the apparatus embodying my invention can be more readily understood.

One method of measurement consists of measuring only the highest pulse within a certain time interval. In doing so, one neglects the duration of individual pulses and the ratio of the number of high to low pulses per unit time. Discounting the ratio of high to low pulses is probably the most crucial error in this method. By comparing the patterns of medium and heavy knock shown in FIGURES 1 and 2 it can be seen that the medium knock pattern contains pulses of nearly the same maximum height as does the pattern of heavy knock. The obvious difference between the patterns of these two knock levels is the recurrence of high amplitude pulses in the heavy knock pattern. While high amplitude pulses do occur more frequently during heavy knock than during medium or light knock, it is obvious that merely measuring only the pulse of greatest amplitude during a certain time interval is to some degree inaccurate.

Another method consists of only counting the number of pulses above a certain amplitude, e.g., only those pulses audible to the skilled operator. In this manner two of the three variables, namely the amplitude of the individual pulses and the ratio of the number of high to low pulses per unit time, are adequately considered. While this method is somewhat more accurate than the first method and can easily be implemented by employing an electronic counter with a trigger level that excludes all pulses below a certain amplitude, it does not take into consideration the duration of each pulse.

A third method of measuring the knock intensity, and by far the most accurate, consist of measuring the area under each of the pulses. This can be accomplished simply by feeding the pulse signal as an input to an integrating circuit, thereby yielding a summation of the total area under the pulses within a unit time. This is by far the most accurate of the three methods mentioned inasmuch as all three of the variables are taken into account.

For a more complete understanding of the apparatus of my invention reference is made to FIGURES 4 and 5.

In FIGURE 4 reference numeral 10 indicates the head of a cylinder in a spark-ignition internal combustion engine which head 10 has a port 11 extending therethrough and communicating with the combustion chamber of the engine. A detector 12 is positioned in the port 11 extending through the head 10 of the cylinder. Detector 12 is coupled to transducer 16 as indicated by line 14.

The transducer 16 is employed to convert the sound vibrations into an electrical signal which is fed to a preamplifier 20 as indicated by line 18. The preamplified output signal from preamplifier 20 is then fed to a high pass filter circuit 24 as indicated by line 22. High pass filter 24 is designed to attenuate that portion of the signal falling below a pre-determined level. In this particular instance the high pass filter circuit 24 is adjusted so that the level below which the signal is attenuated is 6 kc. The output from filter circuit 24 is coupled to high gain amplifier 28 as indicated by line 26. The output signal from high gain amplifier 28 is in turn fed to low pass filter circuit 32 as indicated by line 30. Low pass filter 32 is designed to attenuate that portion of the signal falling above a predetermined level. In this particular instance the low pass filter circuit 32 is adjusted so that the level above which the signal is attenuated is 7 kc. The output signal from filter circuit 32 can be coupled as the input to integrator 40 and/or meter 42 as indicated by line 34 coming from low pass filter 32 and connecting with lines 36 and 38 leading to integrator 40 and meter 42, respectively. It will be understood, of course, that an appropriate switching device, not shown, would be required to effect such coupling.

When merely the presence of knock is to be detected, the output from the low pass filter circuit 32 is fed only to meter 42. However, when the relative knock intensity is to be determined the output from filter 32 is fed as input to integrator 40. By feeding the output from filter 32 to both integrator 40 and meter 42 both the relative knock intensity and the amplitude of an individual pulse can be determined.

Also shown in FIGURE 4 is a cathode ray oscilloscope 44 to which can be coupled the output from low pass filter 32 as indicated by the connection of lines 34 and 46. The oscilloscope 44 is not an essential part of the embodiment of my invention illustrated in FIGURE 4 but is employed when it is desired to display visually the form of the signals from the output of low pass filter 32.

In FIGURE 5 is illustrated an embodiment of a detecting device which I find particularly advantageous for employment in the apparatus of my invention. Such device includes a first generally cylindrical body member 50 shown in a vertical position. Intermediate the ends of member 50 is located an enlarged portion 52 having a plurality of flat faces 54 adapted to be gripped by a wrench. The portion of the surface of member 50 above the enlarged portion 52 is provided with threads 56. Proximate the lower end of member 50 is located an outwardly extending annular flange 58. The lower surface of flange 58 is disposed perpendicular to the axis of member 50 thereby defining a flat shoulder 60 about member 50. The portion of the surface of member 50 below flange 58 is provided with threads 62. Member 50 is also provided with a cylindrical passageway 64 disposed coaxially with member 50. Proximate the lower end of member 50, passageway 64 connects with another cylindrical passageway 66 disposed coaxially with member 50 and passageway 64. Passageway 66 is diametrically greater than passageway 64. Extending upwardly from the lower end of member 50 is threaded cylindrical passageway 68 disposed coaxially with member 50, passageways 64 and 66 and connecting with passageway 66. Threaded passageway 68 is diametrically greater than passageway 66. Located between passageway 66 and threaded passageway 68 is a flat, annular shoulder 70 disposed in a plane perpendicular to the axis of member 50. Located within threaded passageway 68 is a first diaphragm 72 circular in shape and of approximately the same diameter as threaded passageway 68. Diaphragm 72 is positioned such that the periphery of the upper surface thereof bears against shoulder 70. Also shown in this figure is a hollow, cylindrical externally threaded member 74. Member 74 is threadedly received in passageway 68 and bears against the periphery of the lower surface of diaphragm 72.

Located at the upper end of member 50 is an internally threaded cylindrical member 76 having an outwardly extending annular flange 78 at the lower end thereof. Cylindrical member 76 is threadedly engaged by the threads 56 on the upper end of member 50. Also threadedly engaged by threads 56 and positioned below member 76 is nut 80.

Positioned above first cylindrical body member 50 and disposed coaxially therewith is a second hollow cylindrical body member 82. As shown in this figure, body member 82 is composed of a resilient material such as rubber or a resilient elastomer. Disposed and held within member 82 proximate the upper end thereof is an internally threaded annular disc 84. Disposed and held within the lower end of member 82 and extending downwardly therefrom is hollow cylindrical guide member 86. Threadedly received in annular disc 84 is a bell shaped diaphragm mounting device 88 consisting of an upper portion 90 and a lower portion 92 with a second diaphragm 94 peripherally clamped between the upper and lower portions 90 and 92. The second body member 82 is secured at its upper and lower ends by clamps 96 which are designed to permit the rotational movement of body member 82 and prevent longitudinal or transverse movement of body member 82. As shown in FIGURE 5, the clamps 96 are attached to a fixed body.

Disposed intermediate first and second body members 50 and 82 is a coil spring 98, which is connected at its upper end to the exterior of guide member 86 and at its lower end to the exterior of cylindrical member 76 above the annular flange 78. The connection is effected by brazing or welding. Coil spring 98 is normally fully retracted.

Also shown in this figure is a rigid bar 100 disposed within first and second body members 50 and 82 and the interior of coil spring 98. The lower end of bar 100 is affixed to the upper surface of first diaphragm 72 and the upper end of bar 100 is affixed to the lower surface of second diaphragm 94, thereby providing a mechanical linkage between first diaphragm 72 and second diaphragm 94.

In operation, the apparatus of FIGURE 5 is connected with the interior of the combustion chamber of an internal combustion engine by inserting the lower end of the first cylindrical body member 50 into a threaded port in the head of the engine. The threads 62 are engaged in the threaded opening leading into the combustion chamber thereby assuring a secure connection. Advantageously, a gasket member can be placed around the exterior of the opening through the head and as the first body member 50 is advanced into the opening the shoulder 60 of flange 58 will bear against the gasket member thereby insuring a vapor-tight seal. As mentioned above, the second body member 82 is freely rotatable thereby facilitating the threaded engagement of first body member 50 with the head.

When not in use, the relative longitudinal positions of first and second body members 50 and 82, respectively, are maintained such that no significant force is brought to bear on first diaphragm 72 or second diaphragm 94 by rigid bar 100. Once the device of FIGURE 5 has been connected to an engine, nut 80 and internally threaded cylindrical member 76 are advanced downwardly along the threads 56 on the upper portion of first body member 50. Inasmuch as coil spring 98 is connected at one end to the cylindrical member 76 and at the other end to cylindrical guide member 86, the downward movement of cylindrical member 76 places coil spring 98 in tension biasing the first body member 50 towards the second body member 82 resulting in the application of pressure to both the first and second diaphragms 72 and 94, respectively, by rigid bar 100. As will be understood the lower surface of first diaphragm 72 is exposed to the interior of the combustion chamber and any movement of the first diaphragm 72 caused by the sounds originating within the combustion chamber will be communicated by means of rigid bar 100 to second diaphragm 94. As noted in FIGURE 5 the upper end of diaphragm mounting device 88 can be connected to a transducing means, not shown, such as a microphone.

As shown in the drawing, the first diaphragm 72 is of substantially greater thickness than second diaphragm 94. In application I have found that it is desirable to employ as a first diaphragm 72 a steel sheet having a thickness of about 0.060 inch. In addition to the obvious requirement of employing a diaphragm of substantial strength due to its direct exposure to the interior of the combustion chamber, the use of such a comparatively heavy gage diaphragm has the additional advantage of damping lower amplitude sounds thereby permitting only the transmission of the more significant sounds.

The purpose of fabricating the second body member 82 from a resilient material is to dampen extraneous engine vibrations which might otherwise be transmitted. I have found this expedient to be extremely beneficial in eliminating the vibrations resulting from mechanical causes in the normal operations of the engine, which vibrations are in no way related to knock.

In effect then, the particular embodiment of the apparatus shown in FIGURE 5 provides a first diaphragm disposed in sealing contact with an opening through a cylinder wall or head, a second diaphragm mounted in a means separate from the engine cylinder and fixedly positioned, a mechanical linkage operable to transmit movement of the first diaphragm to the second diaphragm thereby generating externally of the cylinder a signal generally corresponding in frequency and amplitude to the sounds originating within the cylinder. While the mechanical linkage employed to transmit movement from the first diaphragm to the second diaphragm, as illustrated in FIGURE 5, is a rigid bar it will be understood that a variety of other mechanical linkages having the capability of rapidly transmitting variable forces of tension and compression can also be employed.

While the particular embodiment of a detector illustrated in FIGURE 5 shows the use of cylindrical body members and the employment of threads as a means of connecting the various pieces, it will be understood that the body members can be of any generally elongated shape which provides the functional capabilities of mounting the diaphragms, having the lower end of the first body member adapted for communication with the combustion chamber and adequate protection for the mechanical linkage employed to transmit movement from the first diaphragm to the second diaphragm. Further, it is not necessary to have the first and second body members connected to a coil spring but any of the well known devices can be employed to effect biasing the first body member toward the second body member.

I claim:

1. A method for measuring knock in a spark-ignition internal combustion engine which includes the steps of generating externally of said engine a signal corresponding in frequency and amplitude to the sounds originating within said engine, selecting from said generated signal that portion falling within the range from about 6 kc. to about 7 kc. and integrating the selected signal to produce an output responsive to the amplitude and duration of said selected signal which yields the summation of the areas under the pulse curves for the selected signal; thereby indicating the intensity of the knock in the engine.

2. An apparatus for measuring knock in a spark-ignition internal combustion engine which includes detecting means located externally of said engine, said detecting means being responsive to the sound originating within said engine and having an output circuit generating a signal corresponding in frequency and amplitude to said sounds, filtering means to which the output circuit of said detecting means is connected as an input, said filtering means having an output circuit responsive to that portion of said signal within the range of from about 6 kc. to 7 kc.; and integrating means to which the output of said filtering means is connected as an input, said integrating means having an output circuit responsive to the amplitude and duration of the signal received by the integrating means as an input thereto which yields the summation of the areas under the pulse curves for the last-mentioned signal; whereby the knock intensity is indicated by the output of said integrating means.

3. An apparatus for measuring knock in a spark-ignition internal combustion engine which includes detecting means located externally of said engine, said detecting means being responsive to the sounds originating within said engine and having an output circuit generating a signal corresponding in frequency and amplitude to said sounds, filtering means to which the output circuit of said detecting means is connected as an input, said filtering means having an output circuit responsive to that portion of said signal within the range of from 6 kc. to 7 kc., and indicating means to which the output from said filtering means is connected as an input, said indicating means having an output responsive to the amplitude and duration of said output from said filtering means; whereby the intensity of the knock in said engine is indicated by the amplitude and duration of said filter output; said detecting means including a first diaphragm disposed in an opening through the wall of a combustion chamber of said engine with the periphery of said first diaphragm in sealing contact with said wall and a second diaphragm mounted in fixedly positioned means separate from said engine, said first diaphragm and said second diaphragm being interconnected by a mechanical linkage operable to transmit movement of said first diaphragm to said second diaphragm.

4. An apparatus for measuring knock in a spark-ignition internal combustion engine having means defining the combustion chamber and other means defining an opening through said first named means which apparatus includes a device generating externally of said combustion chamber a signal corresponding in frequency and amplitude to sounds originating within said combustion chamber, said device including a first diaphragm disposed in said opening with the periphery of said diaphragm in sealing contact with said means defining said opening and a second diaphragm mounted in means separate from said engine, said first diaphragm and said second diaphragm being interconnected by a mechanical linkage operable to transmit movement of said first diaphragm to said second diaphragm, filtering means to which the output of said detecting means is connected as an input, said filtering means having an output responsive to that portion of said input within the range from about 6 kc. to about 7 kc., and indicating means to which the output from said filtering means is connected as an input, said indicating means having an output responsive to the amplitude and duration of said output from said filtering means; whereby the intensity of the knock in the engine is indicated by the amplitude and duration of the output.

5. In combination with a combustion chamber of an internal combustion engine having means defining an opening through the wall of said combustion chamber, a device for generating externally of said combustion chamber a signal corresponding in frequency and amplitude to the sound within said combustion chamber, said device including a first diaphragm disposed in said opening with the periphery of said first diaphragm in sealing contact with the means defining said opening and a second diaphragm mounted in fixedly positioned means separate from said engine, said first diaphragm and said second diaphragm being interconnected by a mechanical linkage operable to transmit movement of said first diaphragm to said second diaphragm.

6. In combination with a combustion chamber of an internal combustion engine having means defining an opening through the wall of said combustion chamber providing communication between the interior of said combustion chamber and the exterior of said combustion chamber, a detecting device for generating externally of said combustion chamber a signal corresponding in frequency and amplitude to the sounds detected within said combustion chamber, said device including a first elongated member having means defining a first longitudinal passageway therethrough, said first member being disposed in sealing contact with said opening through the wall of said combustion chamber at one end thereof with said first longitudinal passageway communicating with said opening through the wall of said combustion chamber, a second elongated member composed of a resilient material having means defining a second longitudinal passageway therethrough, said second member spaced apart from said first member and positioned relative to said first member so that said second longitudinal passageway is aligned with said first longitudinal passageway, a first diaphragm positioned across said first longitudinal passageway proximate the end of said passageway remote from said second member, said first diaphragm providing a vapor-tight seal across said first longitudinal passageway, a second diaphragm positioned across said second longitudinal passageway proximate the end of said passageway remote from said first member, a rigid bar located intermediate said first diaphragm and said second diaphragm with one end of said bar extending into said first longitudinal passageway from the end of said first passageway proximate said second member and the other end of said bar extending into said second passageway from the end of said passageway proximate said first member, one end of said bar being connected to said first diaphragm and the other end of said bar being connected to said second diaphragm, adjustable spring means connected to said first member and said second member biasing said first member towards said second member, and means connected to said second member preventing longitudinal and transverse movement thereof.

7. A device for reproducing externally of an internal combustion engine the sounds originating within a combustion chamber of such engine which device includes a first elongated member and a second elongated member, each said elongated member having means defining a longitudinal passageway therethrough, said first elongated member and said second elongated member being spaced apart and positioned relative to each other such that the longitudinal passageways in both said elongated members are aligned, a first diaphragm positioned across said longitudinal passageway through said first elongated member and located proximate the end thereof remote from said second elongated member, a second diaphragm positioned across said longitudinal passageway through said second elongated member and located proximate the end thereof remote from said first elongated member, a rigid bar located intermediate said first diaphragm and said second diaphragm and positioned such that one portion of said bar extends into the longitudinal passageway through said first elongated body from the end thereof remote from said first diaphragm and another portion of said bar extends into the longitudinal passageway through said second elongated body from the end thereof remote from said second diaphragm, one end of said bar being connected to said first diaphragm and the other end of said bar being connected to said second diaphragm, adjustable spring means connected to said first elongated member and said second elongated member biasing said first elongated member towards said second elongated member, and means connected to said second elongated member preventing longitudinal and transverse movement thereof, said end of said first elongated member remote from said second elongated member being adapted to be received in vapor-tight communication with the interior of a combustion chamber of an internal combustion engine.

References Cited by the Examiner

UNITED STATES PATENTS

| 1,897,811 | 2/1933 | Martin | 73—35 X |
| 2,068,744 | 1/1937 | Gutzke | 73—35 X |
| 2,340,714 | 2/1944 | Fraver et al. | 73—35 |
| 2,416,614 | 2/1947 | Crossley et al. | 73—35 |
| 2,448,323 | 8/1948 | De Boisblanc | 73—35 |
| 2,633,738 | 4/1953 | De Boisblanc | 73—35 |
| 2,731,520 | 1/1956 | Richardson | 73—35 X |

LOUISE R. PRINCE, *Primary Examiner.*

ROBERT L. EVANS, JOSEPH P. STRIZAK, RICHARD C. QUEISSER, *Examiners.*